Nov. 8, 1949 W. L. McNAMARA ET AL 2,487,354
CONVEYER FOR CHANGING COURSE OF ARTICLES
FROM SINGLE TO PLURAL ROWS
Filed Feb. 14, 1945 3 Sheets-Sheet 1

INVENTORS
William L. M<sup>c</sup>Namara
Frederick Z. Fouse.
BY
Corbett, Mahoney & Miller
ATTORNEYS

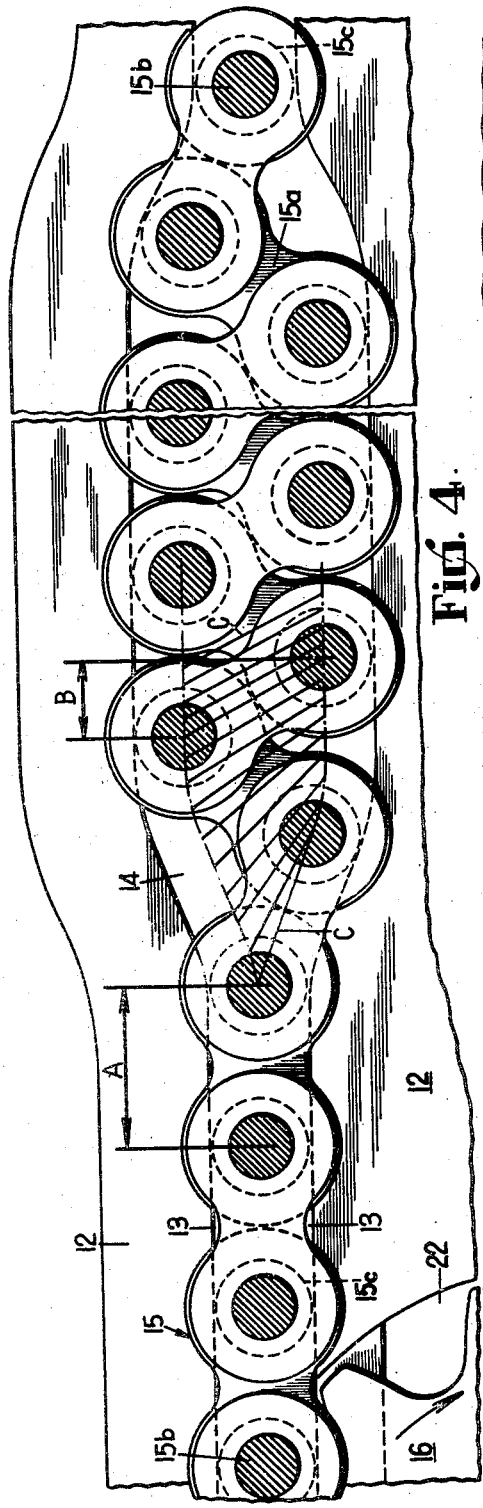
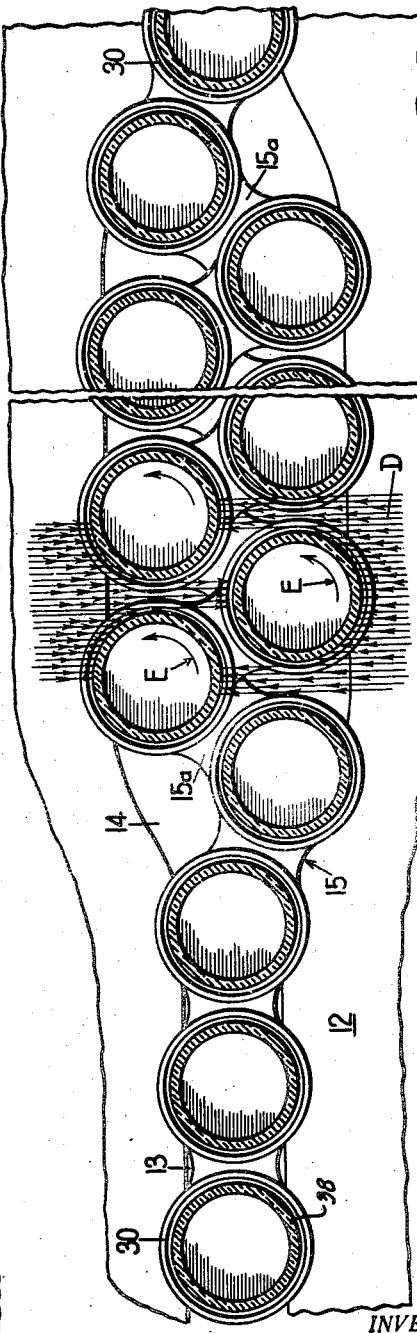
Fig. 4.
Fig. 5
INVENTORS
William L. McNamara.
Frederick Z. Fouse.
BY
ATTORNEYS

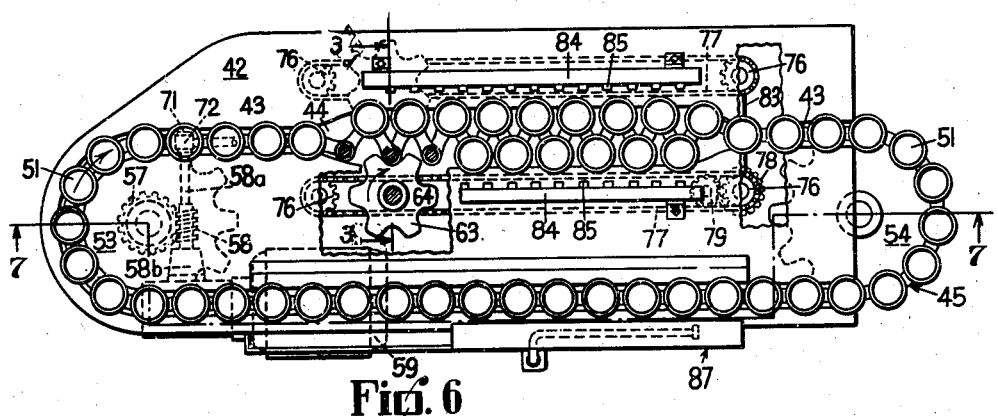
Fig. 6
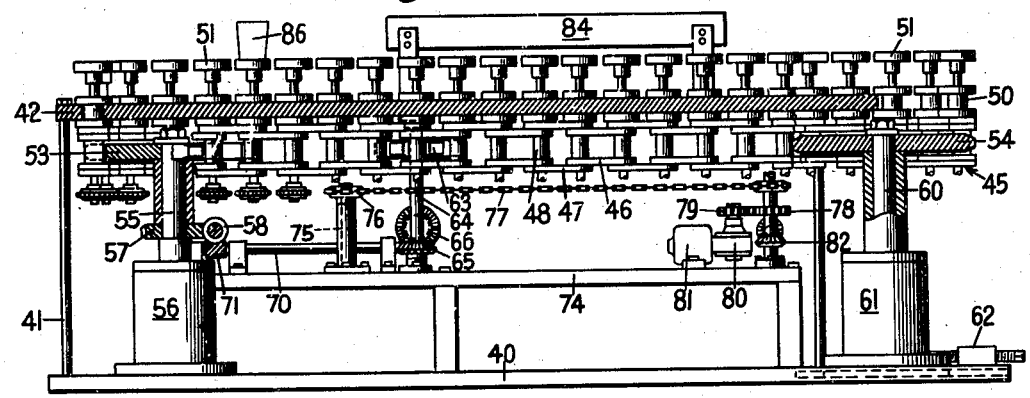
Fig. 7
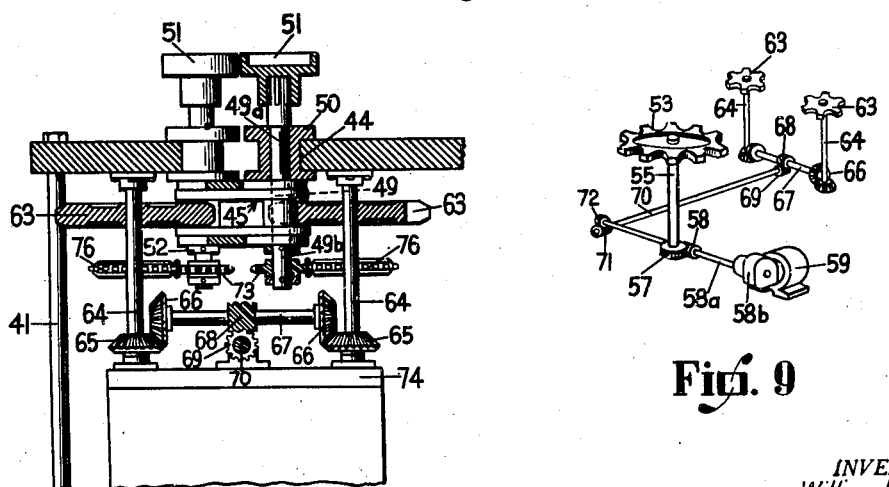
Fig. 8
Fig. 9
INVENTORS
William L. McNamara
Frederick Z. Fouse
BY
Corbett, Mahoney + Miller
ATTORNEYS Patented Nov. 8, 1949

2,487,354

UNITED STATES PATENT OFFICE 2,487,354

CONVEYER FOR CHANGING COURSE OF ARTICLES FROM SINGLE TO PLURAL ROWS

William L. McNamara and Frederick Z. Fouse, Lancaster, Ohio, assignors to Anchor Hocking Glass Corporation, Lancaster, Ohio, a corporation of Delaware Application February 14, 1945, Serial No. 577,811

5 Claims. (Cl. 198—31)

Our invention relates to conveyers. It has to do particularly with conveyers for moving or transporting various articles from one location to another location in which said articles are caused to travel throughout a portion of the length of the conveyer in a single file at a predetermined speed and throughout another portion of the length of the conveyer with the articles in double file relationship and at a predetermined lower rate of speed, approximately half speed, while in said double file relationship. The invention also has to do with an improved conveyer of the foregoing character which is particularly well adapted for use in various industries such, for example, as the glass industry.

One of the objects of the present invention is to provide an improved power driven conveyer which is driven at a constant rate of speed and in which the conveyer chain and its article supporting means are capable of travel for a predetermined distance in single file at a given rate of speed and for another given distance in double file relationship at a considerably reduced rate of speed while in said double file relationship.

Another object of the invention is to provide a conveyer such as described in the preceding paragraph in which the motive power means for driving the conveyer operates at a constant speed while the movement of the conveyer chain and its article supporting means are capable of shifting from a single file relationship into a double file staggered relationship and to travel in said last-named relationship at a reduced speed for a predetermined portion of their travel.

A further object of the invention is to provide an improved conveyer of the foregoing character having conventional means for driving the endless conveyer chain thereof and auxiliary driving means to assist in the movement of the conveyer chain particularly when said chain is in its double file relationship.

Another object of our invention is to provide an improved conveyer having an endless conveyer chain provided with spaced article supporting means which latter are capable of being rotated or revolved at various speeds during a portion of the travel of said conveyer chain.

A further object of our invention is to provide an improved conveyer of the foregoing character having means for effectively and efficiently lubricating the endless chain of the conveyer.

Another object of our invention is to provide an improved conveyer having an endless chain provided with spaced article supporting means in which the chain and article supporting means are capable of travel for a predetermined distance in single file relationship at a given speed and for another predetermined distance in double file staggered relationship at a reduced rate of speed, whereby to permit the use of the conveyer in connection with various operations such as heat treating, for article inspection purposes, in assembly line installations, for article spraying operations, and for various other purposes.

Another object of our invention is to provide an improved endless conveyer of the foregoing character which is adapted particularly for use in connection with a glazer for glassware, ceramics, et cetera; it being an important object of the invention when used in this connection to cause the conveyer chain and its article supporting means to assume a double file and travel at a reduced rate of speed when in said double file whereby to obtain a maximum amount of heat energy in a minimum length of travel through a battery of burners for glazing purposes.

A further object of our invention is to provide an improved conveyer such as that mentioned above for use in connection with a glazing apparatus whereby to obtain a maximum amount of heat from a minimum number of gas burners to effect a very substantial saving of fuel gas; it being another object of the invention to effect the crowding together of a number of articles carried by the conveyer chain into a relatively short space and to cause said articles to be rotated so as to expose all sides thereof directly to the gas flames of the glazer unit.

Another object of our invention is to provide an improved glazer structure for glassware, ceramics, or the like, which includes an endless conveyer for carrying the articles to be glazed between a pair of opposed relatively short batteries of gas burners, in which the endless conveyer is provided with a plurality of spaced article supporting means and in which the conveyer and its article supporting means travel in single file throughout the major portion of their travel and in double file in staggered relationship through that portion of their travel which is located between the opposed pair of batteries of burners, the speed of travel being greatly reduced while said conveyer and its article supporting means are passing between said batteries of burners.

It is another object of our invention to provide improved means for rotating the article supporting means of the conveyer chain which is independent of the driving means for the conveyer chain and which is capable of rotating or revolving the article supporting means at variable speeds and in different directions.

Generally speaking, the present invention relates to an improved conveyer of the character above mentioned in which the conveyer comprises a framework carrying a trackway or guideway through which an endless conveyer chain travels, said guideway throughout a portion of its length causing the endless conveyer chain and its article supporting means or members to travel in a single file, with another portion of said trackway or guideway being so formed and proportioned that the conveyer chain and article supporting means will shift from single file relationship into double file staggered relationship and travel in said relationship throughout a given portion of the guideway, and in which the endless chain and its supporting means will again shift into single file relationship and continue its travel through the guideway. The conveyer structure includes, merely by way of example, a driving sprocket or sprocket wheel and a driven sprocket or sprocket wheel with which the endless conveyer chain is in operative engagement, the driving sprocket having applied thereto a source of power which operates at a constant speed for driving the conveyer chain. When the conveyer chain shifts from its single file relationship into its double file relationship it travels at reduced, approximately half speed as compared to its speed of travel when in single file. Thus, the conveyer chain and its article supporting means move at half speed when in double file relationship.

When and if desired, auxiliary or "booster" means may be provided for assisting in the movement or travel of the conveyer chain when in its double file relationship. Such auxiliary means is preferably driven by the constant speed power means applied to the driving sprocket.

When it is desirable to employ our improved conveyer in connection with a glazer, means is provided for effecting the rotation of the article supporting means of the conveyer chain while said chain and means are traveling in double file relationship. The means for rotating the article supporting members is preferably driven by a source of power which is independent of the power driving means for the conveyer chain and is preferably in the form of a variable speed reversible electric motor which is suitably and drivingly connected to suitable means which contact and revolve the article supporting means or members. When the apparatus is used in connection with a glazer, relatively short batteries of gas burners are disposed at opposite sides of the trackway or guideway through which the conveyer chain and its article supporting means are caused to travel in double file relationship. It will be appreciated that by the doubling-up of the conveyer chain and its article supporting means, articles carried thereby will be in relatively close relationship so that all of the heat energy emitted by the batteries of gas burners will impinge directly upon the articles with very little, if any, loss of heat. By automatically slowing down the speed of travel of the conveyer chain when in its double file relationship it will be understood that the desired glazing operation can be performed by means of considerably shorter gas burner batteries than was heretofore possible with conventional types of glazers.

The improved conveyer apparatus of our invention is also provided with suitable means for forcing lubricant to the conveyer chain to reduce friction and wear of the parts.

The foregoing and other objects of our invention will appear from the following description and appended claims when considered in connection with the accompanying drawings forming a part of this specification wherein like reference characters designate corresponding parts in the several views.

Figure 1:
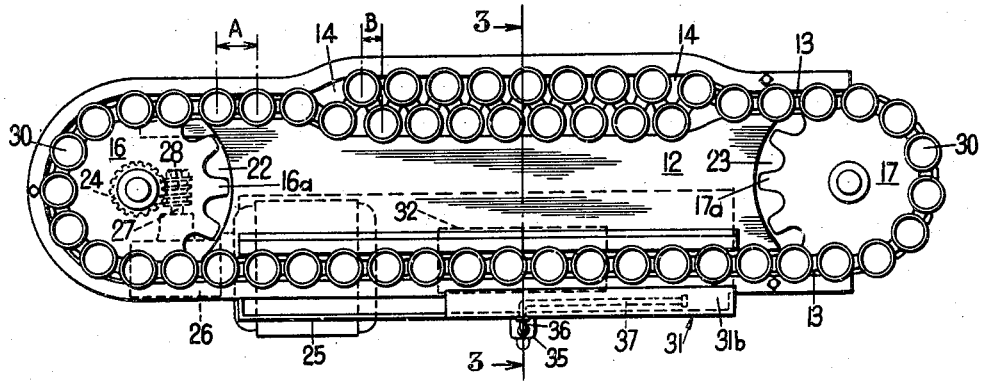
Fig. 1 is a top plan view of an improved conveyer structure embodying our invention.

Fig. 4 is a fragmentary top plan view, on an enlarged scale, illustrating a portion of the trackway or guideway of the apparatus of our invention and indicating, diagrammatically, the shifting or conversion of the conveyer chain and its article supporting means from its single file relationship into its double file staggered relationship and also indicating the reduction in the speed of travel of the conveyer when in its double file condition.

Fig. 5 is a top plan view generally similar to Fig. 4 and also on an enlarged scale, showing articles in position upon the article supporting means of the conveyer chain and indicating the fact that said articles may be rotated while in double file relationship.

Fig. 6 is a top plan view, partly in section and partly broken away for clarity, of a somewhat modified form of apparatus embodying our invention, said apparatus being particularly a glazer.

Fig. 7 is a vertical longitudinal sectional view taken substantially along the line 7—7 of Fig. 6, looking in the direction of the arrows.

Fig. 8 is a fragmentary vertical transverse sectional view, partly in elevation, taken substantially along the line 8—8 of Fig. 6, looking in the direction of the arrows; and Fig. 9 is a diagrammatic view, in perspective, illustrating the driving means for the endless conveyer chain of the apparatus shown in Figs. 6, 7 and 8.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology and terminology employed herein is for the purpose of description and not of limitation, and it is not intended to limit the invention herein claimed beyond the requirements of the prior art.

Referring now to the drawings and particularly to Figs. 1 to 5, inclusive, thereof, there is shown an improved endless conveyer structure embodying our present invention. As shown, with particular reference to Figs. 1, 2 and 3, the structure comprises a supporting base 10 upon which upright supports 11 are positioned. The uprights 11, as shown, support a frame structure above the base 10. This frame structure is shown, merely by way of example, as a horizontal plate or table 12. The plate or table 12 is provided with a trackway or guideway having a narrow portion 13 and a widened portion 14 which latter merges with and forms a continuation of the narrow portion 13. It will be noted, see particularly Fig. 1, that the widened portion 14 of the guideway is located in the far side of the platform or table 12 and represents a minor portion of the entire trackway or guideway.

An endless conveyer chain, shown as a whole at 15, is adapted to travel in the guideway portions 13 and 14. This endless conveyer chain 15 is operatively associated with a driving sprocket or sprocket wheel 16 located at one end of the structure and with a driven sprocket or sprocket wheel 17 located at the opposite end of the structure. The driving sprocket 16 is mounted upon a vertical shaft 18 whose lower end has a bearing supporting base 19. The driven sprocket 17 is similarly mounted upon a supporting shaft 20 whose lower end is mounted in a bearing base 21.

The driving sprocket 16 is located in a circular opening 22 formed in the plate 12 and the driven sprocket 17 is located in a semi-circular space or opening 23. Thus, the sprockets 16 and 17 are in horizontal alignment or registry with the guideway portions 13 and with the sprocket chain 15. The shaft 18 carries a worm gear 24, see Figs. 1 and 2. Means is provided for driving the sprocket 16 and in turn the endless conveyer chain and driven sprocket. Such means, as shown, is a constant speed electric motor 25 mounted upon the base 10. Associated with this motor is a reduction gear containing box 26 from which projects a shaft 27 carrying a worm 28 which is in mesh with the worm gear 24. Thus, by operating the electric motor 25, the endless conveyor chain 15 will be driven, through the medium of the sprocket 16, at a constant predetermined rate of speed.

It will be understood that the chain 15 is formed from a plurality of links 15a which are connected together and to one another by vertical pins 15b having anti-friction surrounding sleeves 15c. It will also be understood that the teeth or peripheral projections 16a and 17a of the sprockets will engage the sleeves 15c which surround the pins 15b between the links 15a. Thus, the chain 15 is driven by the sprocket 16.

The upper link members 15a of the chain each support a pair of upright posts 29 and each of these posts carries, as shown, an article supporting member 30 which may be in the form of a circular cup-like member to receive an article to be transported by the conveyer. Each of the article supporting members 30 has a depending hub extension 30a which telescopes over the upright post or pin 29, the hub extension and post having a relatively loose fit to permit the article supporting member 30 to be rotated or revolved, if desired, relative to its supporting post.

It is desirable to provide lubricant to the endless conveyer chain 15 so as to reduce friction, wear and noise of the parts when the apparatus is in operation. One such means for supplying lubricant is illustrated. As shown, a trough-like member 31 is supported beneath the table 12 and is provided with a reservoir or supply tank portion 32. The lubricant supplying means is associated with the front side stretch or length of the conveyer chain where it travels in single file. The front wall 31a of the trough-like member extends upwardly above the table 12 and has an inwardly projecting overhanging flange 31b formed thereon. A guard strip 33 is mounted on the platform or table 12 in opposed relationship to the wall extension 31a and flange 31b. Oil is pumped from the reservoir 32 through a pipe line 34 by means of a pump 35 which directs it into a pipe line 36 to a nozzle 37 which nozzle directs oil on to the endless conveyer chain 15, see particularly Fig. 3. The pump 35 is preferably operated by an electric motor M. The trough-like member 31 serves to catch any oil which drops from the conveyer chain throughout its travel in its forward stretch or length. This oil flows back into the reservoir 32 and is again forced under pressure through the nozzle 37 on to the chain 15. By virtue of the structure just defined, lubricant may be applied directly to the chain and will be confined to a restricted area by virtue of the trough-like member and the guards described.

When the electric motor 25 is operated to drive the conveyer chain 15, the drive will be through the driving sprocket 16 directly to the chain. This will tend to move the chain and its article supporting means or members 30 in single file relationship through the narrow portion 13 of the guideway toward the entrance to the widened portion 14 of the guideway or trackway. When traveling in single file relationship the centers of the article supporting members 30 will be maintained in the spaced relation as indicated at A in Figs. 1 and 4. As, however, the chain and its article supporting means are pushed by the sprocket 16 into the throat or opening of the guideway portion 14, the links of the chain and their article supports will be shifted into zig zag relationship as clearly seen in Figs. 1 and 4 until they assume the double file relationship in which they are shown, within the confines of the widened portion 14 of the guideway. When in said double file relationship the centers of each of the pairs of staggered article supporting members will be moved together so as to occupy positions which are approximately one-half the distance apart lengthwise of the widened trackway portion 14, as indicated at B in Figs. 1 and 4, as when in their previous positions as shown at A.

As shown, the trackway portion 14 is approximately twice the width of the trackway portion 13, thus permitting the double file relationship of the chain and its article supporting means. It is to be understood that while the driving sprocket 16 is driven at a constant rate of speed, the speed of travel of the grouped-together chain links and article supporting members within the widened portion 14 of the guideway will be reduced to approximately one-half the speed of travel of these members while they are in their single file relationship and traversing the narrow portion 13 of the guideway. When the members of the chain and their article supporting means reach the exit end of the slot portion 14 at the right of Fig. 1, the links again shift gradually into their single file relationship with the centers of the article supports being again spaced as at A before moving into contact with the driven sprocket 17.

Thus it will be seen that by driving the conveyer chain 15 at a constant speed by the motor 25, said chain and its article supporting means will travel at a predetermined rate of speed throughout the narrow portions 13 of the guideway and at a predetermined lower rate of speed, approximately half speed while traveling in their double file staggered relationship through the widened portion 14 of the guideway.

As stated above, the distance between the center lines of the link pins and article supports when the chain is in single file relationship in the narrow slot portions 13 is indicated at A in the enlarged scale view of Fig. 4 whereas the center line spacing lengthwise of the conveyer when the chain and its article supporting means are in grouped-together and double file relationship in the enlarged portion 14 of the guideway, is shown at B in this figure. The imaginary center lines shown at C in this figure serve to indicate the shifting movement of the chain links and article supporting means from their single file relationship into their double file relationship, these lines C also being intended to indicate the slowing down of the movement or travel of the chain as it approaches the center line distances indicated at B while traveling in the enlarged portion 14 of the guideway or track.

In Fig. 5 of the drawings there is shown the parts illustrated in Fig. 4 with the article supporting means or members having articles 38 carried thereby. In the event the conveyer is being used in conjunction with heat treatment of the articles 38 it will be noted, as indicated by the series of arrows D, that the heat waves are concentrated on the surfaces of the double file articles and that any heat which might have a tendency to pass through the space between an adjacent pair of articles arranged lengthwise of the apparatus would come in contact with the surface of an article disposed directly behind the said pair of articles. Moreover, if the apparatus was being employed in connection with a spraying operation, all of the fluid sprayed or forced upon the articles would, in like manner, find its way onto the surface of the articles. Additionally, if the apparatus were in the form of a glazer, with a battery of gas burners disposed on each side of the guideway portion 14 (said burners not being shown) any flames from said batteries of burners which happen to pass through spaces between adjacent pairs of articles would contact articles located behind said pairs, thus effecting a substantial saving in fuel. It will be understood that, if desired, the articles 38 may be rotated as indicated by the arrows E.

Figure 2:
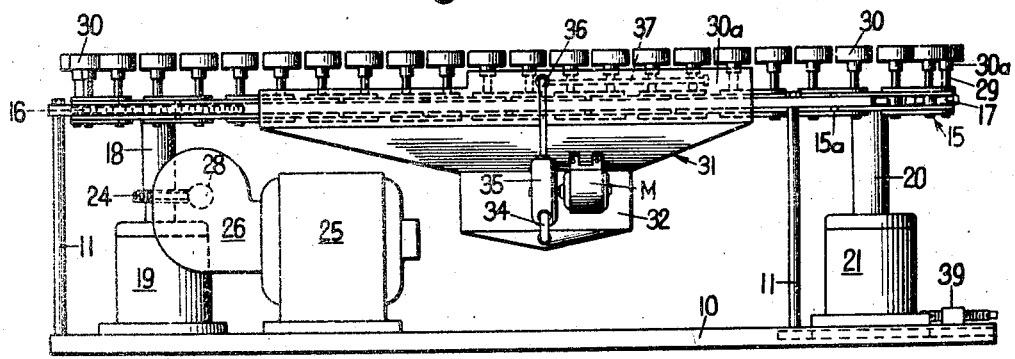
Fig. 2 is a side elevational view of the structure shown in Fig. 1.
Figure 3:
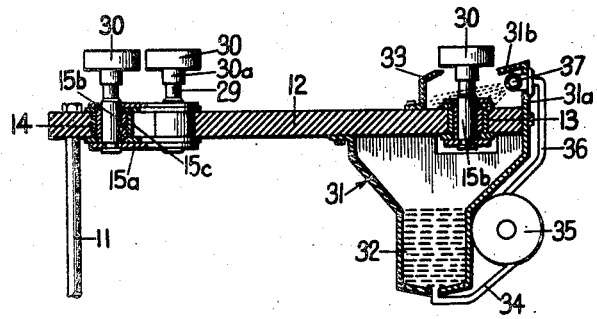
Fig. 3 is a transverse vertical sectional view taken substantially along the line 3—3 of Fig. 1, looking in the direction of the arrows.

It is desirable to maintain the endless conveyer chain 15 taut at all times and to accomplish this, suitable adjustment means, shown as a whole at 39, see Fig. 2, is employed. By actuating this adjusting means, the driven sprocket 17 and its supporting shaft 20 and base 21 may be shifted to the right of Fig. 2. For loosening the chain, said means is employed to shift the parts toward the left of this figure.

Such a conveyer as described above has many advantages and varied uses in many industries, only a few of which have been mentioned above. By virtue of the present structure, it is possible to move articles at one speed and in single file relationship for any desired distance and to then automatically shift the articles into double file relationship and cause them to move while in said last-named relationshsip at a greatly reduced speed for another portion of their travel.

A conveyer structure like that described above is particularly useful, for example, in connection with the inspection of various articles which might be carried from one point to another point on an endless conveyer. By increasing the number of articles at one point in the conveyer length while at the same time substantially reducing the speed of travel of the articles, such articles could be minutely inspected during their reduced speed of travel.

Referring now particularly to Figs. 6 to 9, inclusive, of the drawings, there is shown in these figures a glazer for glazing glassware, ceramics, or the like, embodying the present invention. The apparatus of these figures comprises a supporting base 40 upon which uprights 41 are positioned. The uprights 41, as shown, support a frame structure above the base 40. This frame structure is shown, merely by way of example, as a horizontal plate or table 42. The plate or table 42 is provided with a trackway or guideway having narrow portions 43 and a widened portion 44 which latter merges with and forms a continuation of the narrow portions 43. It will be noted, see particularly Fig. 6, that the widened portion 44 of the guideway is located in the far side of the platform or table 42 and represents a minor portion of the entire trackway or guideway.

An endless conveyer chain, shown as a whole at 45, is associated with the guideway portions 43 and 44. This endless conveyer chain comprises inner pairs of link members 46 and cooperating outer pairs of link members 47, the two cooperating pairs of link members being maintained in spaced relationship by the usual spacer sleeves 48. Adjacent pairs of the inner and outer link members are pivotally connected together by link pins 49 which extend upwardly and downwardly through and beyond the pairs of links to provide upper pin extensions 49a and lower pin extensions 49b. Rotatably mounted upon each of the pin extensions 49a is a flanged roller 50. Mounted upon the upper end of the extension 49a above the roller is a substantially cup-like article support or member 51. The member 51 is preferably keyed or splined to the extension 49a so as to be rotatable therewith.

As clearly seen in Figs. 7 and 8, the flanged rollers 50 fit within and are adapted to travel in the narrow slots or guideway portions 43 and in the wider guideway portion 44. Thus, as the chain is moved, the flanged rollers 50 will travel freely in the guideway portions, carrying with them the article supporting means or members 51.

The lower extension 49b of the link pins carry collars 52 which are fixed thereto in any suitable manner and which serve to maintain the adjacent pairs of links 46 and 47 in assembled relationship.

As shown, the means for driving the endless conveyer chain 45 comprises a driving sprocket 53 located adjacent one end of the apparatus and a driven sprocket 54 located adjacent the opposite end of the apparatus. The sprocket 53 is mounted upon an upright drive shaft 55 whose lower end is located in a supporting bearing or base member 56. The shaft 55 carries a worm gear 57 with which a worm 58 is in mesh, the worm 58 being mounted upon a drive shaft 58a projecting from a reduction gear box 58b whose gears are driven by an electric motor 59, see Fig. 6.

The driven sprocket 54 is mounted upon an upright supporting shaft 60 whose lower end is carried by a bearing support or base member 61. The endless conveyer chain 45 may be adjusted and maintained taut by means of a suitable adjusting device shown at 62 in Fig. 7. It will be understood, that the driving and driven sprockets are in mesh with the spacer sleeves 48 of the conveyer chain and that the chain is driven by the driving sprocket 53.

While the driving means just described is usually sufficient for driving a conveyer chain of usual or normal length and weight, it may prove desirable to provide some auxiliary means for assisting in the driving of the conveyer chain where said chain is of relatively heavy structure and of considerable length. Therefore, in accordance with the present invention, there is provided a pair of auxiliary driving sprockets 63. These sprockets 63 are mounted upon vertically disposed shafts 64 which carry at their lower ends bevel gears 65. These bevel gears are in mesh with bevel gears 66 mounted upon a transversely extending shaft 67, which shaft carries at a point intermediate its ends a spiral gear 68. This gear is in mesh with a similar spiral gear 69 mounted upon a longitudinally extending shaft 70 whose opposite end carries a similar spiral gear 71 which is in mesh with another spiral gear 72 carried by the transversely extending drive shaft 58a from the gear reduction mechanism 58b. Thus, as the driving sprocket 53 is driven by the electric motor and gear reduction assembly, the auxiliary or "booster" sprockets 63 will likewise be driven. It will be understood that the sprockets 63 engage the spacer sleeves 48 of the endless chain assembly to assist in the movement of said chain. As shown, the pair of auxiliary driving sprockets 63 is located adjacent the entrance or throat portion of the enlarged or wider slot or guideway portion 44. As seen in Fig. 6, as the links of the endless chain and their article carrying or supporting means 51 shift from their single file relationship in which condition they travel through the guideway portion 43 into their double file and staggered relationship within the widened guideway portion 44, the sprockets 63 at opposite sides of said portion 44 engage the successive spacer sleeves 48 of the chain and move them forwardly through the slot portion 44. It will be understood that the travel or movement of the conveyer chain and article supporting means when in double file relationship within the guideway portion 44, is considerably slower than the speed of movement of said members when in single file relationship while traveling in the guideway portions 43. In fact, the chain travels in its double file relationship at approximately half the speed of its travel when in single file relationship. This is due to the fact that as the chain links are continuously pushed into the widened portion 44 of the guideway, they veer off the original line of travel that they followed while in the narrow portion 43 of the guideway, and fold first to one side and then to the other of the widened portion, thereby traveling through a greater distance than when they were moving in the narrow portion. The delay in the progressive movement of the folding links of the chain not only slows the progressive movement of such links but also slows the progressive movement of all the previously folded links which are being pushed through the widened portion. At the exit end of the widened portion 44, as the links are continuously pushed from such widened portion, they unfold first from one side and then from the other of such portion and move into single file, which action requires the same amount of time as the original folding action and further delays progressive movement of all the folded links still in the widened portion. That the speed of movement of the chain through the widened portion 44 of the guideway is substantially one-half the speed of its movement through the narrow portion 43 is evident from Figure 1 which shows that there are substantially twice the number of article-supporting members 51 in the widened portion of the guideway as in the same length of the narrow portion of the guideway.

If it is desirable to rotate or revolve the article supporting means 51 when said means is traveling in double file staggered relationship within the guideway portion 44, suitable means may be provided for this purpose. Merely by way of illustration, and with particular reference to Fig. 8 of the drawings, the lower extensions 49b of the link pins carry sprockets 73. Mounted upon a platform or support 74 carried by the base 40 are two pairs of upright shafts 75, these being spaced transversely and longitudinally of the support 74. Each of the shafts carries at its upper end a sprocket 76 and associated with each pair of these sprockets and extending longitudinally of the frame is a sprocket chain 77. One of the upright shafts 75 is provided with a gear 78 which is in mesh with a driving gear 79 carried by the drive shaft of a gear reducing mechanism 80, said gear reducer being preferably driven by a variable speed reversible electric motor 81. The two upright shafts 75 at the right side of Figs. 6 and 7 are drivingly connected together by bevelled gearing 82 and an interconnecting shaft 83, Fig. 6. Thus, when the electric motor 81 is driven all of the shafts 75 will be rotated and will in turn drive the sprockets 76 and the two endless sprocket chains 77. When the elements of the endless chain 45 move through the widened guideway portion 44, the sprockets 73 carried by the shaft extensions 49b will come in contact with the endless sprocket chains 77 and the article supporting members 51 will be rotated during their travel in double file relationship through the slot portion 44. Since the electric motor 81 is of the variable speed reversible type, the speed of rotation, as well as the direction of rotation of the article supports may be varied and controlled at will.

It will be seen that the widened portion 44 of the guideway represents a minor portion of the whole guideway and that at its opposite ends it merges with the narrow guideway portions 43.

Located on opposite sides of and extending substantially throughout the length of the widened guideway portion 44, is a battery of gas burners 84, each of which has a series of nozzles 85. The gas burners are in opposed relationship and discharge gas flames directly onto the surfaces of articles 86 traveling at a low rate of speed, in double file relationship and being revolved while so traveling between the batteries of burners. Thus, by reason of the grouped-together double file of articles, any flames which pass through spaces between adjacent articles will impinge against the surfaces of the articles in the opposite row or file. In this manner there is practically no waste or loss of the gas flames, by virtue of which a material saving in fuel costs is achieved. The action of the gas flames upon the articles is illustrated clearly by the arrows D in Fig. 5. By virtue of our invention, the glazing operation can be performed satisfactorily by a greatly reduced number of burner nozzles and hence shorter batteries of burners than was heretofore possible with conventional glazers wherein long stretches of burners were used and wherein the articles were passed between the burners in single file spaced relationship. Much fuel was wasted since a goodly proportion of the flames passed through the spaces between the articles without contacting those articles and was lost. Moreover, with our improved structure, a more even and uniform temperature can be and is maintained.

The shifting of the elements of the conveyer chain and of the articles 86 from single file relationship in the guideway portions 43 to the double file relationship in the guideway portion 44, is the same as is illustrated in detail in Fig. 4 of the drawings, wherein the distance between the center lines of the link pins 49 and the article supports 51 when the articles are traveling in the narrow slot portions 43, is indicated at A, whereas the center line spacing lengthwise of the conveyer when the article supporting means are in grouped-together and double file relationship in the enlarged portion 44 of the guideway, is shown at B in this figure. Moreover, the action of the parts and their gradual decrease in speed of travel is the same in Fig. 6 as is indicated by the imaginary center lines shown at C in Fig. 4.

As in the preceding form of the invention, it is desirable to provide lubricant under pressure to the endless conveyer chain. For this purpose, lubricant supplying means, shown as a whole at 87 may be employed. Such means is substantially like that shown in Figs. 1, 2 and 3 of the drawings and as in those figures, comprises a trough-like portion, a reservoir, means for withdrawing lubricant from the reservoir and forcing it onto the moving parts, together with splash boards or guards on opposite sides of the narrow guideway portion 43 to confine the lubricant to a restricted area.

Having thus described our invention, what we claim as new is:

1. Conveying apparatus comprising a supporting frame, a substantially horizontally disposed guideway carried by said frame, said guideway having a narrow portion and having a widened portion which merges with and forms a continuation of the narrow portion, an endless substantially horizontal conveyer associated with said guideway, said conveyer comprising a chain composed of a plurality of links pivoted together by vertically disposed pivot pins for relative movement, said pins carrying article-supporting members, guide means associated with said chain and engaging said guideway, said chain passing around sprockets associated with said guideway and one of which is a driving sprocket, means for driving said last-named sprocket, said chain having a total extended length greater than the total length of said guideway and said driving sprocket engaging said chain ahead of said widened portion of said guideway so that as said driving sprocket pushes the chain into said widened portion of said guideway the links will fold against each other and so that the article-supporting members will be in single file relationship while the chain is associated with the narrow portion of said guideway and will be in double file and staggered relationship while the chain is associated with the widened portion of said guideway.

2. Conveying apparatus according to claim 1 wherein the article-supporting members are carried on the upper ends of said pins, and means associated with the lower ends of said pins and with the widened portion of said guideway for rotating said pins and thereby rotating the articles as they are moved along the widened portion of said guideway.

3. Conveying apparatus comprising a supporting frame, a guideway carried by said frame, said guideway having a narrow portion and having a widened portion which merges with and forms a continuation of the narrow portion, an endless conveyer associated with said guideway, said conveyer comprising a chain composed of a plurality of links pivoted together for relative movement, guide means associated with said chain and engaging said guideway, said chain passing around sprockets associated with said guideway and one of which is a driving sprocket, means for driving said last-named sprocket, said chain having a total extended length greater than the total length of said guideway and said driving sprocket engaging said chain ahead of said widened portion of said guideway so that as said driving sprocket pushes the chain into said widened portion of said guideway the links will fold against each other, and additional driving means for engaging said chain and forcing it into the widened portion of said guideway, said additional driving means including driven sprockets located just inside the mouth of said widened portion and engaging the folded chain on opposite sides thereof.

4. Conveying apparatus according to claim 3 wherein the chain and the guideway are substantially horizontally disposed, said links of the chain being pivoted together by vertically disposed pivot pins, said pins carrying article-supporting members so that the articles will be in single file relationship while the chain is associated with the narrow portion of said guideway and will be in double file and staggered relationship while the chain is associated with the widened portion of said guideway.

5. Conveying apparatus according to claim 4 wherein the article-supporting members are carried on the upper ends of said pins, and means associated with the lower ends of said pins and with the widened portion of said guideway for rotating said pins and thereby rotating the articles as they are moved along the widened portion of said guideway.

WILLIAM L. McNAMARA.
FREDERICK Z. FOUSE.

REFERENCES CITED

The following references are of record in the file of this patent:

UNITED STATES PATENTS

| Number | Name | Date |
|---|---|---|
| 1,540,021 | Knight | June 2, 1925 |
| 1,557,368 | Kershaw et al. | Oct. 13, 1925 |
| 1,768,482 | Koch | June 24, 1930 |
| 1,856,863 | Clark | May 3, 1932 |
| 2,174,241 | Grotzinger | Sept. 26, 1939 |